Feb. 19, 1924.
H. F. SCHMIDT
REFRIGERATING MACHINE
Filed May 2, 1921
1,483,990
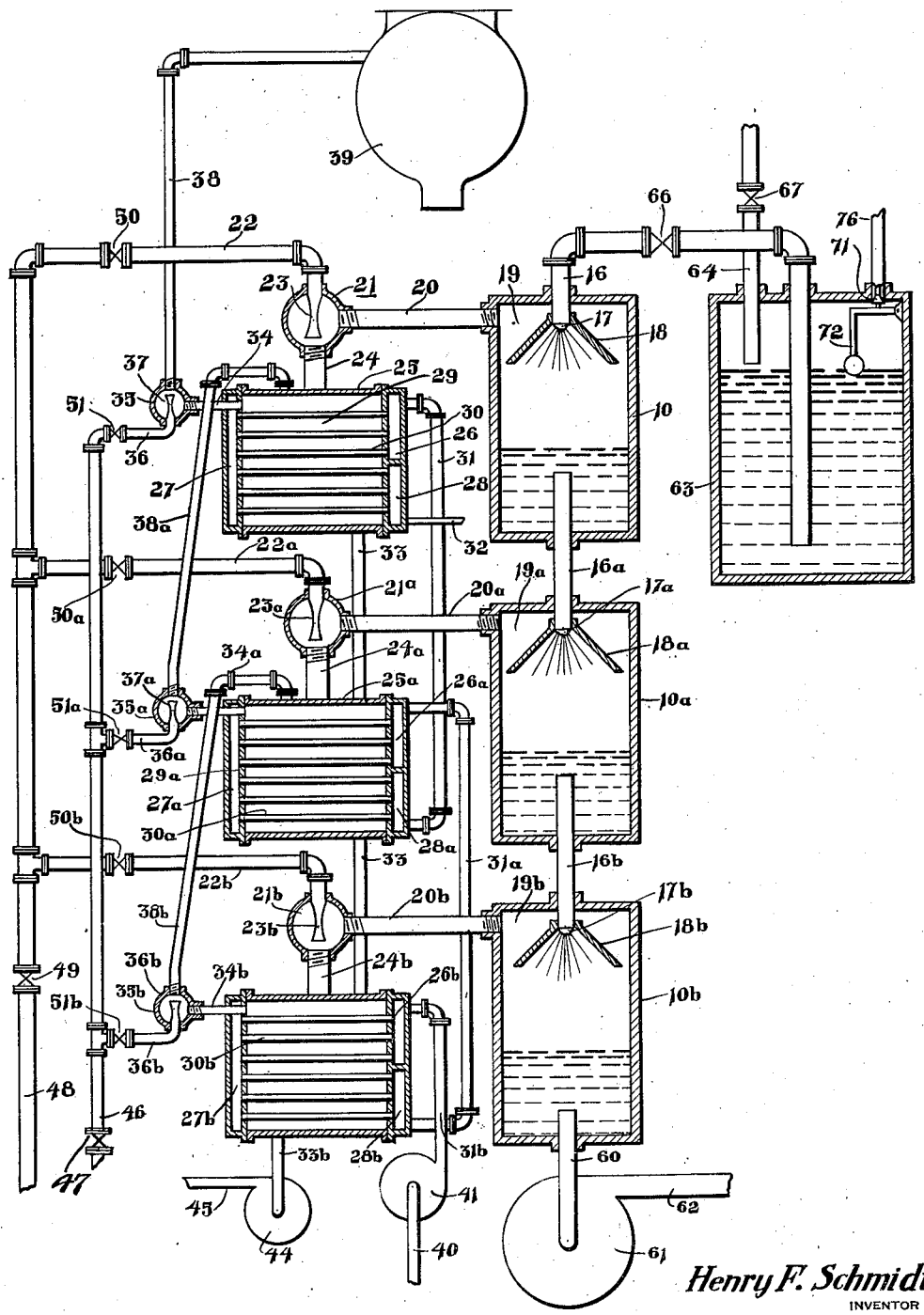
Henry F. Schmidt
INVENTOR
BY
D.C. Davis
ATTORNEY Patented Feb. 19, 1924.

1,483,990

UNITED STATES PATENT OFFICE.

HENRY F. SCHMIDT, OF SWARTHMORE, PENNSYLVANIA, ASSIGNOR TO WESTINGHOUSE ELECTRIC AND MANUFACTURING COMPANY, A CORPORATION OF PENNSYLVANIA.

REFRIGERATING MACHINE.

Application filed May 2, 1921. Serial No. 466,060.

*To all whom it may concern:*

Be it known that I, HENRY F. SCHMIDT, a citizen of the United States, and a resident of Swarthmore, in the county of Delaware and State of Pennsylvania, have invented a new and useful Improvement in Refrigerating Machines, of which the following is a specification.

My invention relates to the art of refrigeration and it has particular reference to processes and mechanisms for producing low temperatures in fluids employed as circulating or refrigerating media.

An object of my invention is the provision of a novel method and means for procuring low temperatures in a refrigerant fluid by causing the evaporation of a portion of the refrigerant fluid in several stages under successively lower conditions of pressure and temperature. It is a further object of my invention to provide a novel method and means of the character designated in which vapors extracted from the refrigerant fluid in several stages at successively lower pressures are condensed separately in connection with each stage at a pressure corresponding to the pressure in the associated stage, and in which the condensable portions of the vapors extracted from each stage are caused to pass to condensing regions of progressively lower absolute pressures and the non-condensable portions of the vapors extracted from each stage are caused to pass to condensing regions of progressively higher absolute pressures.

These and other objects of my invention, which will be made apparent throughout the further description thereof, are attained by means of the apparatus embodying features herein described and illustrated in the accompanying drawing in which the single figure is a diagrammatic sectional view of a refrigeration apparatus embodying my invention.

It is a matter of common knowledge that water is cooled by placing it in a porous receptacle and exposing it to a draft. The cooling is a result of the evaporation of a portion of the water, because water, or any liquid, when evaporating must be supplied with heat, and if no external source is available, the heat will be taken from the liquid itself.

It has been heretofore proposed to utilize this principle for artificial refrigeration, viz: to cool water by evaporation and to use the water thus cooled as a refrigerant. The devices proposed have, however, met with no great degree of success owing to their inability to obtain and to maintain economically the low absolute pressures which insure free evaporation at the desired low temperatures of the refrigerant. I have discovered that this principle of refrigeration can be carried out efficiently and at low maintenance cost by causing the continuous evaporation of a refrigerant liquid to take place in a series of evaporators, the absolute pressures, and consequently the temperatures, in which are successively lower. This economy is primarily due to the fact that the volume of vapor required to be removed in the first stages in order to cause a given reduction in the temperature of the refrigerant is but a small fractional part of the volume required to be removed from a single evaporation refrigerator to effect an equal cooling of the refrigerant. This becomes more evident when we consider that the volume of water vapor is substantially inversely proportional to its pressure and that for small decrements in low absolute pressures, increasingly large increments in volumes result. Thus, one pound of water vapor at two pounds absolute pressure, occupies, roughly 150 cubic feet; at one pound pressure, 300 cubic feet; at ½ pound pressure, 600 cubic feet; at ¼ pound pressure, 1,200 cubic feet, at ⅛ pound pressure, 2,400 cubic feet; at 1/16 pound pressure, 4,800 cubic feet. It follows that the volume of vapor handled in the evaporation of a definite amount of water and consequently the work of compression of the vapor increases from the first to the last stages of a multi-stage refrigeration apparatus constructed in accordance with my invention and that the maximum work is expended in the removal of the vapor from the last stage, which stage may be said to operate with approximately the same degree of efficiency as the single evaporation refrigerator. It will be noted, however, that the amount of cooling, and hence the amount of evaporation which takes place in the last stage, is only a proportional part of the entire temperature drop, as for example ¼, ⅓ or ½, depending upon the number of stages used, and that the greater part of the required evaporation occurs under the more favorable conditions of temperature and pressure existing in the earlier stages, and hence requires a lesser expenditure of energy in the compression and removal of the water evaporated. Theoretically, it is possible to multiply the number of stages so that my multi-stage refrigerator will produce a desired cooling of the refrigerant with the expenditure of energy of about ⅕ that required in a single evaporation refrigerator to accomplish the same result.

The present invention contemplates a further economy in the consumption of motive steam necessary to operate the ejector pumps of the refrigeration apparatus above described by employing a multi-stage refrigerator in which the vapors extracted from each stage are delivered to a separate condenser, a condenser being associated with each evaporator, and the condensers of the adjacent stages being so cooperatively associated that the condensate from any condenser passes to a condenser of next lower pressure and the non-condensable fluids from any condenser are delivered to the condenser of next higher pressure, the condenser at highest pressure discharging the non-condensable fluids into an independent condenser, as for example, the condenser of a main power plant. By this arrangement the pressure differences against which any of the ejectors operates is reduced in proportion to the number of stages employed so that it is possible in a refrigeration apparatus having a sufficient number of stages to utilize low-pressure exhaust steam as a motive fluid for extracting the vapors from the evaporators and for removing the non-condensable fluids from the condensers. This permits the employment of low-pressure steam which is normally lost in the operation of power plants, for the operation of a refrigerating apparatus constructed in accordance with the present invention.

Referring to the drawings, the construction illustrated provides for the employment of a plurality of stages, each stage being complete in itself and comprising an evaporator, an ejector evacuating the evaporator and a condenser into which the ejector discharges. This scheme of construction permits the building up of refrigeration apparatus of any number of stages upon the so-called unit plan. I have shown for the purpose of illustration, a three-stage refrigeration apparatus, the stages being designated generally by the numerals 10, 10$^a$ and 10$^b$. The stages being identical in structure, a description of one stage suffices for all, like numerals followed by the letters $a$ or $b$ designating like parts of the stages 10$^a$ or 10$^b$, as the case may be.

The evaporator of the stage 10 comprises a casing 15, an inlet pipe 16 entering the top of the evaporator and terminating in a spray nozzle 17. Secured to the pipe 16 and immediately above the nozzle 17 is a downwardly sloping baffle 18 which extends to within a short distance from the evaporator walls and serves to prevent the refrigerant in a liquid state from passing into the space 19 above the baffle 18.

From the space 19 leads a pipe 20 which communicates with an ejector 21. Steam is supplied to the ejector 21 through a pipe 22, a nozzle 23 of suitable construction being arranged to entrain gases within the ejector 21 and to discharge the mixed fluids into a conduit 24 which leads to a surface condenser 25.

The surface condenser 25 is of the usual horizontal two-pass type in which the cooling water enters a water box 26 and passes successively to water boxes 27 and 28 through the tubes 29 which are suitably attached to the water boxes and which traverse the central condensing chamber 30. The cooling water enters the water box 26 through an inlet pipe 31 and is discharged from the water box 28 through pipe 32. Steam entering the condensing chamber 30 is condensed and the condensate discharged through a pipe 33 leading from the bottom of the chamber 30. A pipe 34 leads from the upper portion of the chamber 30 to an air ejector 35 which receives steam from a pipe 36. A nozzle 37 is arranged to discharge a jet of steam through the ejector and to entrain the air from the chamber 30. The mixed steam and air is discharged through a conduit 38.

The condensers of the several stages are interconnected by means of conduits for the purpose of securing a co-ordinated action in the attainment of the progressively low pressures in the several stages.

The cooling water, supplied from any convenient source through pipe 40, is forced by pump 41 through the inlet pipe 31$^b$ to the last stage condenser 25$^b$, and conveyed therefrom by pipe 31$^a$ to the second stage condenser 25$^a$. The water is then led to the first stage condenser 25 by pipe 31 and is finally discharged by pipe 32 to a cooling tower or to waste.

The condensate from the condenser 25 is conveyed by pipe 33 to the condenser 25$^a$, from whence it is led, with the added condensate of the condenser 25$^a$ to the condenser 25$^b$. The condensate from all stages is delivered from the condenser 25$^b$ to a pump 44 which withdraws the condensate and discharges it through a pipe 45 into any suitable receptacle.

The air removal pumps preferably receive steam through a main 46, provided with a valve 47, from which it is distributed to the branches 36$^b$, 36$^a$ and 36 and air ejectors 35$^b$, 35$^a$ and 35, respectively. The air discharge 38$^b$ from the last stage air ejector 35$^b$ leads to the condensing chamber 30$^a$ of the second stage ejector where the steam is condensed and whence the air together with air accumulating in condenser 25$^b$, is withdrawn by ejector 35$^a$. The air thus withdrawn is delivered to the condensing chamber 30 from which it is finally discharged, with air from the condenser 25, through ejector 35 and pipe 38 to a condenser 39, which may be the main condenser of the power plant.

The steam for operating the main ejectors may be supplied from a main 48, provided with a valve 49, and the branches 22, 22$^a$ and 22$^b$ may be supplied with valves 50. Similarly, branches 36$^b$, 36$^a$ and 36 of the air supply pipe may be provided with valves 51.

The refrigerant liquid is preferably a salt solution, hereinafter termed brine, although for refrigerators operating at a minimum temperature of 36 degress Fahr. and higher, water may be used. In the construction illustrated, the brine passes successively through the evaporators 10, 10$^a$ and 10$^b$ by means of pipes 16, 16$^a$ and 16$^b$, and is discharged from the last evaporator 15$^b$ through a pipe 60 to a pump 61 which forces the brine through a pipe 62 to a cooling chamber or to other use required. The brine at a higher temperature is returned to the brine tank 63 through a pipe 64. The pipe 16 preferably extends to near the bottom of the tank 63 and both the pipes 16 and 64 may be provided with valves 66 and 67 to regulate the flow of the brine. A make-up water pipe 70 is arranged to discharge into the brine tank and is provided with a valve 71 which may be controlled by a float 72, or other liquid level control mechanism, in any well known manner.

Having described the arrangement of a construction embodying my invention the operation thereof is as follows: In starting, the cooling water pump 41 and the air pumps 35 of the several condensers are put in operation and a certain vacuum, approaching the absolute pressure corresponding to the temperature of the cooling water, is produced in the condensers, ejectors and evaporators. The valve 66 between the evaporator 15 and the brine tank 63 is then opened to permit the required amount of brine to pass. The brine pump is next started and the steam admitted to the ejectors 21. The pressures within the evaporators are further lowered and the apparatus is ready for normal operation.

The brine is drawn by suction from the brine tank 63 into the evaporator 10 and in passing through the nozzles 17 near the top of the evaporator is broken up into a fine spray. A portion of this spray in falling to the bottom is vaporized, owing to the low pressure prevailing in the evaporator and the vapors are entrained by the steam jet of the ejector 21 and discharged into the condenser 25 where the entraining steam and the entrained vapors are condensed. The remaining brine which falls to the bottom of the evaporator has a lower temperature by several degrees than it had when it entered the evaporator 15.

The brine from the bottom of evaporator 10 is drawn by suction through pipe 16$^a$ into the evaporator 10$^a$ where a further cooling of the brine is occasioned in the manner described in the preceding paragraph. The brine is drawn from the bottom of the evaporator 10$^a$ through the pipe 16$^b$ into evaporator 10$^b$ and the process may be repeated through any number of stages. The cooled brine from the evaporator of the last stage is withdrawn by the pump 61 and circulated through a refrigerating system, finally returning at an increased temperature to the brine tank, ready to be again drawn into the evaporator 15 and to repeat the cycle.

The brine that is vaporized and withdrawn by the ejectors does not return to the cooling system, and hence an equivalent amount of make-up water is added to the brine in the tank through the float controlled valve, the amount added being about 1 pound for every 1000 B. T. U. extracted from the refrigerant.

The step-by-step reduction of the temperature of the refrigerant recited in the preceding paragraphs is effected by a novel arrangement of the ejectors, the condensers and the evaporators which will now be explained.

Evaporation at the low temperatures existing in the evaporators takes place more rapidly under an extremely high vacuum, the lower the temperature the higher the vacuum required to secure equal evaporations of the refrigerant. It follows that if the refrigerant is passed through evaporators having progressively lower absolute pressures, the work of evaporation can be divided into steps in each of which evaporation should preferably take place under pressures corresponding the vaporization point of the fluid. The first stage evaporator need not then be maintained at as low a pressure as the second, or the second as the third, etc., in order to secure a free evaporation of the refrigerant in each of the several stages.

Moreover, the relatively high vacuum required to cause free evaporation at the temperature at which it is desired to withdraw the refrigerant from the apparatus is secured more economically by the employment of several stages. This is primarily due to the fact that the volume of vapor handled by the early stage condensers and ejectors per degree drop in temperature of the refrigerant is much less than the volume handled in the last stages. A further economy results from the arrangement of the condensers and ejectors within relation to each other. Water for cooling and effecting condensation is delivered first to the last stage condenser and then to the other condensers in inverse order. The absolute pressure in a condenser being a function of the temperature of the cooling water, the lowest absolute pressure is thus maintained in the last stage condenser and the absolute pressures are progressively higher in the remaining condensers.

The arrangement of the air removal pumps whereby the air pump serving any condenser is discharged into the condenser at the next higher pressure insures an economical and highly efficient operation of the air removal. As will be seen in the installation illustrated, the third stage air ejector 35 discharges air mixed with motive steam into the second stage condenser where the steam is condensed and the air together with air accumulating in the second stage is removed by the ejector pump 35 and is discharged into the first stage condenser 25. Here again the steam is condensed and the air from the first stage condenser is removed by the air ejector 35 which may discharge into a condenser 39. The small pressure head against which each of the air pumps operates insures an economical withdrawal of all non-condensable gases and permits the employment of low-pressure steam.

The main ejectors 21, 21$^a$ and 21$^b$ also operate under low-pressure heads the pressure differences between that of the condenser and the evaporator of any stage being not more than 1 or 2 inches of mercury. For this reason it is possible to utilize in the main ejectors steam at low pressures.

The chief advantages of my refrigeration apparatus lie in the economy of energy required for the removal of the water evaporated due to the division of work into steps or stages, and the adaptability of the apparatus for the employment of low-pressure steam. The following example will serve as an illustration of the economy resulting from a use of my multi-stage refrigeration apparatus. Assuming that the evaporation of one pound of water will remove 1000 B. t. u. from the refrigerant and that it is desired to secure the refrigerant at 35 degrees Fahr., an evaporator pressure of $\frac{1}{10}$ of a pound must be maintained in the single evaporator. A pound of water under these conditions will occupy approximately 3000 cubic feet, which volume must be handled by the ejector and condenser and discharged to atmospheric pressure in order to remove a thousand B. t. u. from the refrigerant. The same result would be obtained in a four-stage refrigeration apparatus of the character described in the present application in which absolute pressures of $\frac{1}{10}$, $\frac{2}{10}$, $\frac{3}{10}$ and $\frac{4}{10}$ of a pound pressures were maintained in the several stages at a lesser expenditure of energy, measured for convenience in cubic feet of air required to be removed or handled by the ejectors and condensers. Assuming that each stage removes equal quantities of water vapor, and hence produces an equal temperature drop in the refrigerant, the first stage operating at $\frac{1}{10}$ of a pound absolute, in order to remove $\frac{1}{4}$ of a pound of water vapor, needs handle $\frac{1}{4}$ times 800 cubic feet (the specific volume of air at $\frac{1}{10}$ of a pound pressure) or 200 cubic feet of air; similarly the second stage handles $\frac{1}{4}$ times 1000 cubic feet or 250 cubic feet of air; the third stage handles $\frac{1}{4}$ times 1500 cubic or 375 cubit feet of air; and the fourth stage handles $\frac{1}{4}$ times 3000 cubic feet or 750 cubic feet of air. Adding the volumes of air removed, there results 1575 cubic feet, the volume of air handled by the four-stage refrigeration apparatus against 3000 cubic feet handled by a single evaporator to produce the same cooling effect upon the refrigerant. Certain factors have been disregarded in the above illustration, such as the stepped relation of the condensers and air ejectors which further reduce the work of compression and removal of the vapors, for the reason that the pressure differences between the inlet and the discharge portions of the ejectors is never more than a few inches of mercury.

Although I have illustrated the above apparatus as composed of three stages or units, it is to be understood that my invention contemplates the use of any number of stages. The number of stages required in any installation depends upon the difference between the required temperature of the refrigerant and the temperature of the condenser cooling water, and also upon the pressure of steam available for operating the ejectors. The smaller this temperature difference and the lower the steam pressure, the greater the number of stages required to meet any desired demand upon the refrigeration apparatus. My refrigeration apparatus is, however, particularly adapted to utilize low pressure steam, and it will be readily apparent that exhaust steam may furnish the energy necessary for the operation of a refrigeration apparatus constructed as herein set forth. Moreover, by employing a sufficiently large number of stages, exhaust steam of low absolute pressure may be utilized with good results, thereby utilizing energy normally wasted in power plant operation.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. The method of refrigeration involving the evaporation of a portion of a refrigerant for the purpose of lowering the temperature thereof, which comprises subjecting the refrigerant to zones of progressively lower pressures, removing vapors from the refrigerant in the several zones, and condensing the vapors from each zone separately.

2. The method of refrigeration involving the evaporation of a portion of a refrigerant for the purpose of lowering the temperature thereof, which comprises subjecting the refrigerant to zones of progressively lower pressures, removing vapors at progressively increasing specific volumes from the refrigerant in the several zones, and condensing the vapors from each zone separately.

3. The method of refrigeration involving the evaporation of a portion of a refrigerant for the purpose of lowering the temperature thereof, which comprises spraying the refrigerant successively into zones of progressively lower pressures, withdrawing the vapors formed by the sprayed refrigerant separately from each zone, and condensing the vapors from each zone separately.

4. The method of refrigeration involving the evaporation of a portion of a refrigerant for the purpose of lowering the temperature thereof, which comprises spraying the refrigerant successively into zones of progressively lower pressures, withdrawing the vapors formed by the sprayed refrigerant separately from each zone, condensing the vapors from each zone separately, and withdrawing the non-condensable gases from the vapors during condensation.

5. The method of refrigeration involving the evaporation of a portion of a refrigerant for the purpose of lowering the temperature thereof, which comprises spraying the refrigerant successively into zones of progressively lower pressures, withdrawing the vapors formed by the sprayed refrigerant separately from each zone and condensing the vapors from each zone separately under progressively lower absolute pressures, withdrawing the non-condensable gases from the vapors during condensation and discharging the non-condensable gases withdrawn from each condensing region into the condensing region of next higher pressure.

6. In a refrigeration apparatus, a plurality of evaporators, one arranged to receive a refrigerant and discharge it to the other evaporators in series, a condenser operatively connected to each evaporator and means for maintaining the condensers under progressively low pressures.

7. In a refrigeration apparatus, a plurality of evaporators, one arranged to receive a refrigerant and discharge it to the other evaporators in series, a condenser operatively connected to each evaporator and means for maintaining the condensers under progressively lower pressures, said means comprising an air pump for each condenser, and discharge conduits leading from the air pump of each condenser to the condensing chambers of the condenser operating at the next higher pressure.

8. In a refrigeration apparatus, a plurality of evaporators, one arranged to receive a refrigerant and discharge it to the other evaporators in series, a condenser operatively connected to each evaporator and means for supplying cooling water to the condensers so that the condenser associated with the last evaporator of the series first receives the cooling water, from whence the other condensers are supplied in a series inverse in order to that in which the refrigerant is caused to pass through the corresponding evaporators.

9. In a refrigeration apparatus, a plurality of evaporators, one arranged to receive a refrigerant and discharge it to the other evaporators in series, a condenser operatively connected to each evaporator, an ejector disposed in each connection and means for supplying cooling water to the condensers so that the condenser associated with the last evaporator of the series first receives the cooling water, from whence the other condensers are supplied in a series inverse in order to that in which the refrigerant is caused to pass through the corresponding evaporators.

10. In a refrigeration apparatus, a plurality of evaporators, one arranged to receive a refrigerant and discharge it to the other evaporators in series, a condenser operatively connected to each evaporator and means for maintaining the condensers under progressively lower pressures said means comprising a water pump and connection from the pump to the condensers in series so arranged that the cooling water is forced serially through the condensers in an inverse order to that which the refrigerant flows through the corresponding evaporators.

In testimony whereof, I have hereunto subscribed my name this 28th day of April, 1921.

HENRY F. SCHMIDT.